Sept. 4, 1956            G. W. COLTON            2,761,949
PREFABRICATED PIPE SYSTEM
Filed Sept. 29, 1954                                            2 Sheets–Sheet 1
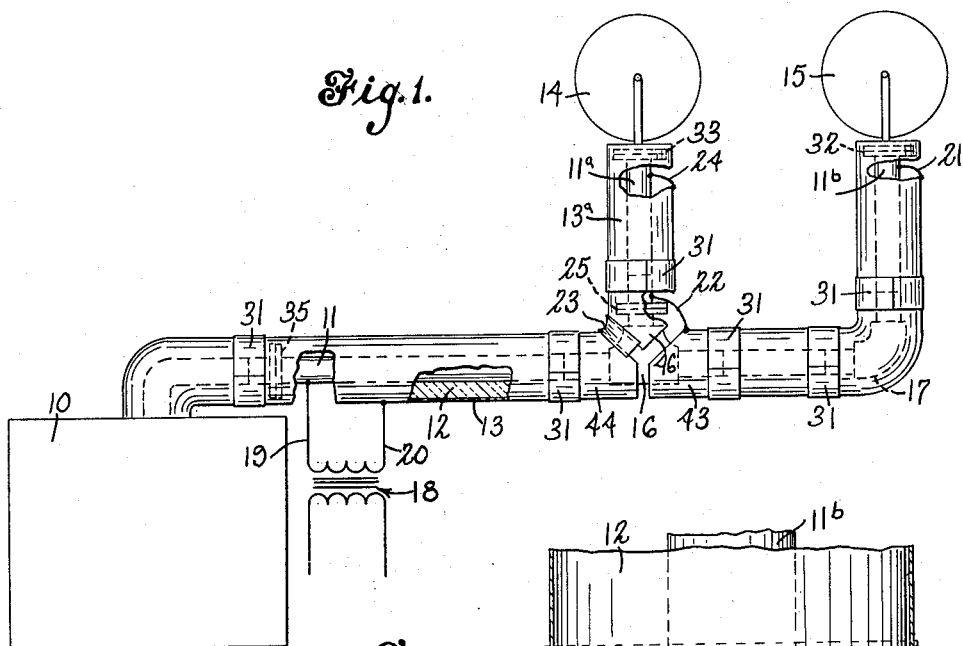
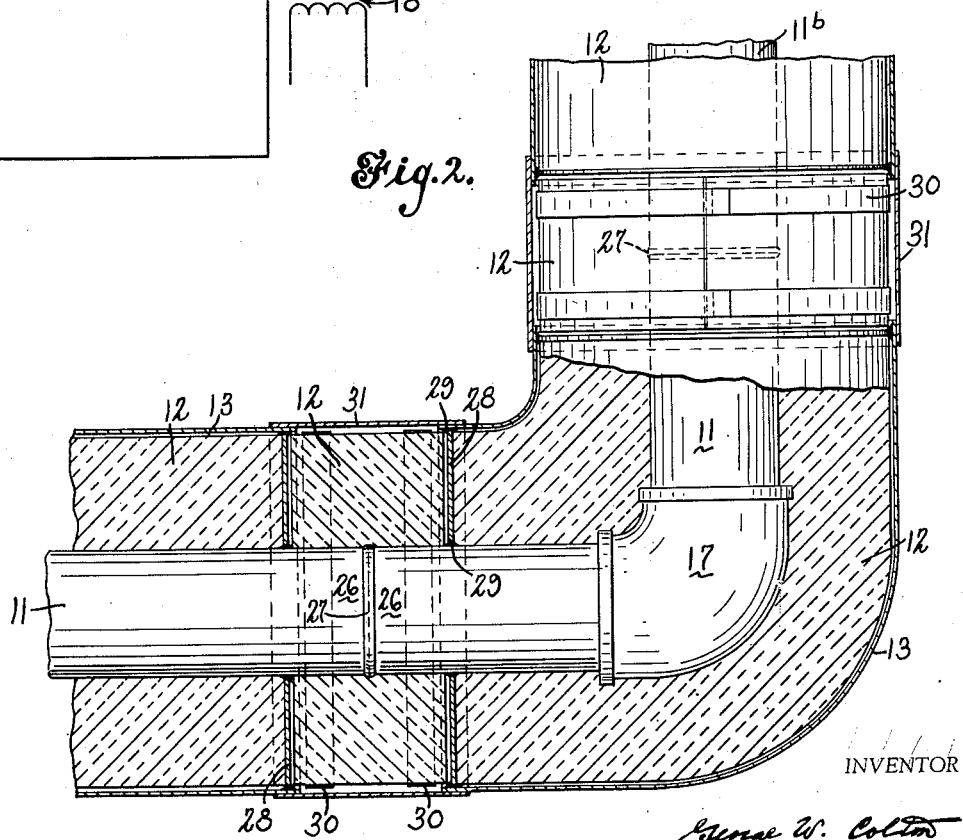
INVENTOR
George W. Colton
BY Rockwell Bartholow
ATTORNEYS Sept. 4, 1956  G. W. COLTON  2,761,949
PREFABRICATED PIPE SYSTEM
Filed Sept. 29, 1954  2 Sheets-Sheet 2

INVENTOR
George W. Colton
BY Rockwell & Sarchotin
ATTORNEYS

United States Patent Office 2,761,949
Patented Sept. 4, 1956

2,761,949

PREFABRICATED PIPE SYSTEM

George W. Colton, New Haven, Conn., assignor to Fluid Systems, Incorporated, Hamden, Conn., a corporation of Connecticut Application September 29, 1954, Serial No. 459,191

11 Claims. (Cl. 219—38)

This invention relates to a pipe system for transporting fluids that must be moved at a fixed temperature such as a high temperature for fluids that would otherwise be too viscous to be pumped, and particularly to a prefabricated pipe system for this purpose.

In many instances it is desired to transport fuels and other liquids of relatively high viscosity from a point of storage to a point of delivery. When the fluid is of such a nature that its viscosity is relatively high at atmospheric temperatures, in order to render the transportation less difficult or in some instances possible, it is necessary to heat the liquid so as to lower the viscosity to the required point.

It has been proposed to effect such heating in some instances by impedance heating of the pipe in which the liquid is carried by the passage of electric current through and along the wall of the pipe. It is, of course, necessary to provide some means for completing the circuit, and this has been effected by the use of a return cable which parallels the conveying pipe. There are, however, a number of disadvantages present in such a system as it is presently installed.

It is necessary to insulate the conveying pipe from the surrounding temperature and when, as is often the case, the pipe is installed underground, such insulation should be electrical as well as heat insulation and should be impermeable to moisture. It is more or less customary to cover the thermal insulation of the pipe with some kind of a protective covering which will offer fairly good resistance to penetration by water. This covering, however, is not always impervious to moisture and offers practically no resistance to mechanical damage which would, of course, destroy its moisture impermeability.

Moreover, the installation of such a system is performed entirely in the field where the pipe lengths are joined with the necessary fittings. This, of course, is not only effected at relatively high cost but such pipe assemblies are prone to leak which gives a great deal of trouble and are expensive to properly repair. Moreover, when the thermal insulation and covering are applied by unskilled labor in the field, they are very often applied by faulty work resulting in permeability to moisture and defective installation.

In addition, the cable which is employed to complete the electrical circuit through the pipe may not be properly sized, where it is installed in the field, and this will result in impairment of performance of the system as will also be the case if the cable is not properly positioned with respect to the pipe itself. Eddy currents may be set up by the return cable which may be harmful.

It is proposed by the present arrangement to provide a prefabricated pipe system for conveying or transporting liquids of relatively high viscosity wherein the pipe lengths and fittings are prefabricated when supplied to the user so that their installation may be readily effected by unskilled labor so that a properly constructed system will result even though the relatively small amount of labor required for installation may be performed by unskilled operatives.

To such end the lengths of pipe together with the necessary fittings will be prefabricated with production equipment and under factory supervision, inspection and tests. These elements will compose not only the conveying pipe itself but a covering of thermal insulation and in addition an outer sheath which will not only give mechanical protection against damage, but will also serve the double purpose of providing a return path for the current employed to heat the pipe.

The outer metallic sheath will be applied over the thermal insulation and will not only protect the insulation against damage but will also provide protection against the entrance of moisture, thus making it possible to guarantee watertightness as well as effective thermal insulation.

Moreover, the protective outer sheath will be so designed and applied that there will be minimum reactance between the pipe, usually of steel, and the sheath itself which will result in the use of the lowest possible reactance voltage and make possible a minimum kva. rating of the transformer employed and the highest possible power factor.

One object of the present invention is to provide a prefabricated pipe system, the units of which comprise a conveying pipe, a covering of thermal insulation, and a protective sheath of a conductive material such that the elements may be factory prefabricated and installed with a minimum of field labor.

A still further object of the invention is to provide prefabricated pipe elements consisting of a conveying pipe, a covering of insulation, and a metallic sheath of suitable conducting material wherein the ends of the conveying pipe may project from the covering whereby these ends may be readily joined, in installation, without disturbing the covering of the pipe and these projecting ends after being joined, may be readily covered with thermal insulation and a conductive metal sheath, the conductive sheath of the entire system not only giving mechanical protection, but also acting as a current conductor.

A still further object of the invention is the provision of various pipe fittings comprising a conveying pipe, an insulating covering and a metallic sheath of conductive material such that a transportation system may be installed employing such elements and an electric circuit readily made including the conveying pipe and the conductive sheath to pass a current through the wall of the pipe and thereby heat the conveying material.

To these and other ends the invention consists in the novel features and combinations of parts to be hereinafter described and claimed.

In the accompanying drawings:

Fig. 1 is a partly diagrammatic view of a conductive pipe system employing the prefabricated pipe elements embodying the present invention;

Fig. 2 is a view partly in section and partly in elevation showing the construction adjacent a pipe elbow.

Figure 3:
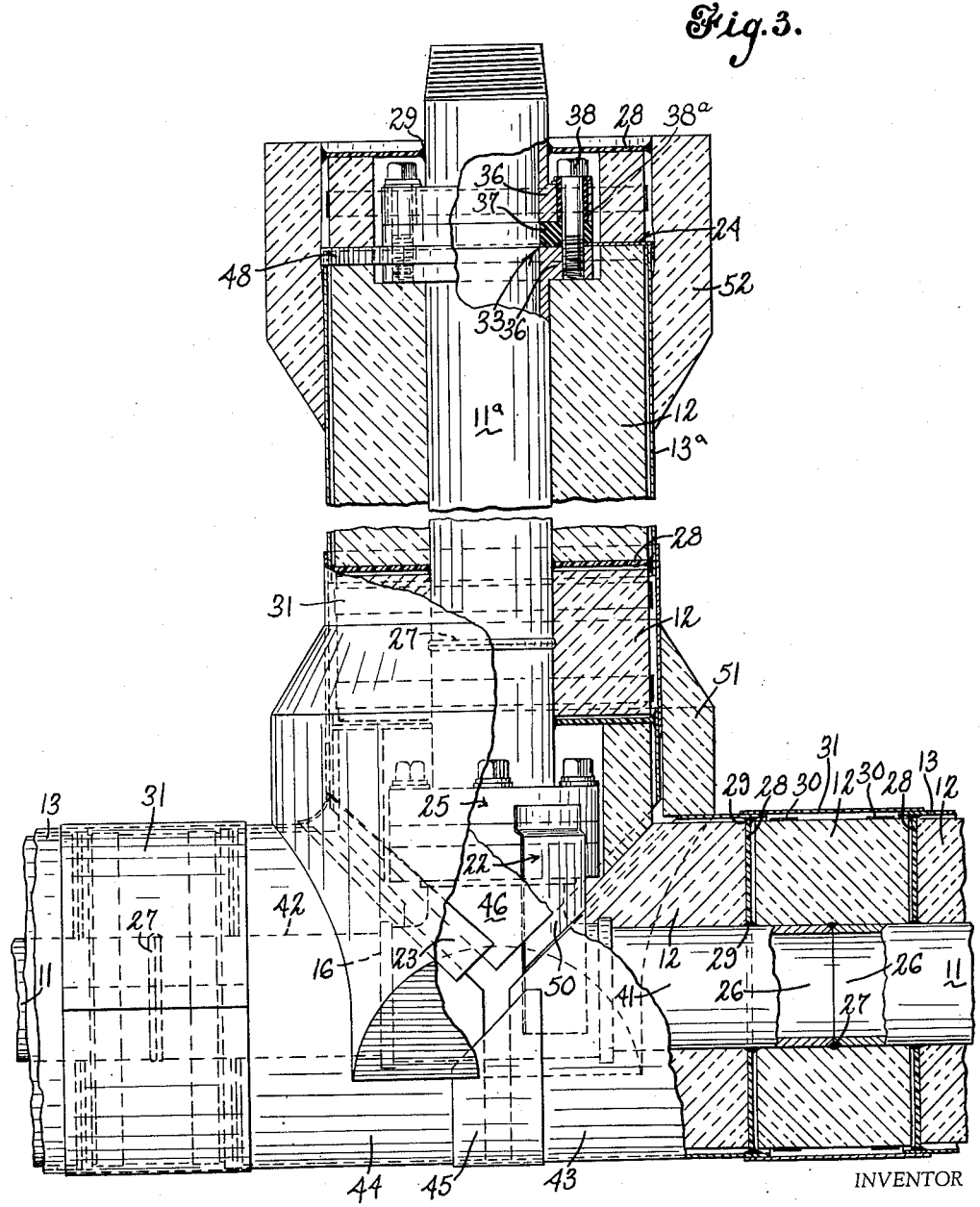
Fig. 3 is a view similar to Fig. 2 showing the construction of a T fitting and adjacent parts of a pipe system embodying the invention.

To illustrate a preferred embodiment of my invention, I have shown a transportation system for liquid materials which may comprise a tank or other source of supply 10, a conveying pipe 11 of steel or similar material, this pipe being covered by a covering of thermal insulation 12 and an outer metallic sheath 13 of suitable conducting material. It will be understood that a pump (not shown) may be employed at a proper point in the system to force the liquid through the pipe.

The conveying pipe 11, as illustrated, leads to a point or points of delivery as illustrated at 14 and 15. These elements may be oil burners, for example, if oil is the liquid being conveyed but, if other viscous liquids are being transported such as paraffin, asphalt or the like, the elements 14 and 15 may merely represent the station to which the liquids are delivered for use.

As shown, the main run of the pipe 11 is provided with two branches leading respectively to the elements 14 and 15; one of these branches 11ª is connected to the pipe 11 by a T fitting designated generally by the numeral 16 and the second branch 11ᵇ leading to the element 15, being the terminal branch, may be connected to the pipe 11 through an elbow 17. The construction of the fittings 16 and 17 as well as that of the main pipe sections will be described more particularly hereinafter.

As shown diagrammatically in Fig. 1, current is applied to the pipe by means of a transformer 18, the secondary of which is connected by the line 19 to the pipe 11 and by the line 20 to the metallic conductive sheath 13. The current travels through the pipe 11 to a point adjacent the end of the branch 11ᵇ where a jumper 21 is provided which electrically connects the pipe with the outer metallic sheath. The current travels through this sheath to a point adjacent the T-fitting 16 where a jumper 22 is provided to electrically connect the sheath with the branch pipe 11ª. It may here be stated that as will be described hereinafter the metallic sheath covering the pipe 11ᵇ and the adjacent portion of the pipe 11 is insulated from the sheath covering the pipe 11ª although the latter is electrically connected by the jumper strip 23 to the portion of the sheath 13 between the branch 11ª and the transformer lead 20. The current, therefore, travels through the branch 11ª of the pipe to the outer end thereof where it is conveyed by a jumper 24 to the conductive sheath 13ª which covers the branch 11ª and thence through the jumper strip 23 to the sheath 13 and back to the transformer lead 20. It may also be mentioned that the section of the pipe 11ª is insulated from the main pipe section 11 by an insulating joint 25.

The construction of the various sections of the pipe is shown more particularly in Fig. 2. As shown in these figures, the pipe 11 projects from the surrounding thermal insulation 12 at each end, this projecting end being designated in Fig. 2 by the numeral 26 and is for the purpose of being connected in a suitable manner such as by welding 27 to the projecting end of an adjacent section or fitting. The conductive sheath 13 is coextensive with the thermal insulation 12, and the end surface of the latter may be effectively sealed by a disk 28 of fiber or the like inserted within the sheath 13 and sealed to the sheath and to the pipe by a suitable mastic or other adhesive 29 so as to be watertight. Thus the pipe sections 11, which may be of the standard lengths of twenty feet, if desired, together with the insulating covering 12 and the protective sheath 13, are so designed as to be readily fabricated in the factory and supplied as a water-proof unit with the ends 26 of the pipe exposed for connection to an adjacent unit.

Similarly the elbow sections are prefabricated, which sections, as shown in Fig. 2, preferably consist of the elbow 17 to which are connected short lengths of the conductive pipe 11. These units will be covered by a covering of insulating material 12 and the conductive sheath 13 except for the projecting ends 26 of the pipe sections 11 which are exposed as previously described for connection to the end 26 of an adjacent pipe section.

When two of the projecting ends 26 have been joined together in the field by welding or the like 27, the two adjacent projecting end portions 26 may then be covered with the thermal insulation 12 which may be temporarily held in place in any suitable manner such as by bands of tape 30. Thereafter, a band 31 of the same material as the metallic sheath 13 is applied over the adjacent ends of the sheath covering the main section and elbow and secured at its ends to the sheaths in a water-tight manner. Thus an electrically conductive joint is made between two adjacent sections, and this joint will be the same whether made between two straight lengths of pipe or between a length of pipe and some other fitting such as a T, elbow or union. It will be understood that, as shown in Fig. 2, the same type of joint will be made in the other end of the elbow with the pipe 11ᵇ and, therefore, the description of this joint need not be repeated.

It has already been stated that the pipe section 11ª is insulated from the T 16 by an insulated joint 25. A similar insulated joint 32 may be employed in the line adjacent the outer end of the pipe 11ᵇ beyond the jumper 21 and another such insulating joint 33 employed in the line 11ª beyond the jumper 24. Further a similar insulating joint 35 may be employed in the pipe 11 between the transformer and the supply source 10. Such joints will, of course, be placed in the line at appropriate places and are of the usual construction, these joints consisting, as shown, for example, in Fig. 3, of flanges 36 secured to the pipe, the flanges being separated by an electrically insulating gasket or washer 37 and being mechanically connected by bolts 38. The bolts are embraced by insulation bushings 38ª.

In Fig. 3 of the drawings I have shown a T construction such as may be employed between the main conducting pipe 11 and the branch pipe 11ª. As shown, this consists of the usual T fitting 16 having connected thereto short nipples or pipe sections 41 and 42. These pipe sections as well as the branch outlets of the T fitting are covered with thermal insulation 12 as before, and this insulation is in turn covered by metallic sheaths of conducting material. Owing to the fact that the current must be passed through the sheath and through the main and branch pipes, the conductive sheath 43 covering the insulation around the pipe 41 is spaced from the conductive sheath 44 surrounding the pipe 42 so that these two sheaths will not be electrically connected. The space between the sheaths may be closed by an insulating strap 45.

A similar sheath 46 surrounds the insulation which covers the other branch of the T, and it is noted that the insulating joint 25 is provided adjacent this portion of the T and included within the thermal insulation 12. The lower (as shown in the drawing) portions of this sheath are spaced from the sheaths 43 and 44 so as to be insulated therefrom. However, the jumper strip 23 is secured across the gap by soldering or the like so as to connect the sheaths 46 and 44 electrically.

At the upper portion of the pipe 11ª is a metallic cap 48 having a central opening so that it may surround the pipe 11ª and have its inner edge soldered to or otherwise connected with the lower flange 36 of the insulated coupling. This cap extends out to the metallic sheath 13ª and makes an electrical connection therewith so as to constitute the jumper 24, shown diagrammatically in Fig. 1. It will be understood that the same type of cap will be employed adjacent the end of the branch line 11ᵇ to constitute the jumper 21, and these caps will also serve to seal the end faces of the terminal insulation where the caps are employed.

The jumper shown diagrammatically in Fig. 1 at 22 is constituted by a metallic strip 50 in electric contact with the sheath 43 at its lower end and with the upper flange of the insulating joint 25 at its upper end so as to carry current from the sheath section 43 to the branch 11ª of the conducting pipe. Thus the current is carried from the outer sheath at this point to the conveying pipe and carried outwardly again by the cap 48 to the sheath at the end of the pipe 11ª to be returned to the transformer through the outer sheaths which cover the pipes 11ª and 11, these sheaths being electrically connected by the jumper strip 23.

It may be noted that the ends of the pipe sections 41 and 42 extend outwardly from the thermal insulation which surrounds them so that they may be connected to the pipe ends of an adjacent section by welding or the like, as shown at 27 on Fig. 3. These projecting ends are then covered by thermal insulation 12 and by a band 31 of metallic conducting material as explained in connection with a similar joint illustrated in Fig. 2.

As the insulating flange 25 is of greater diameter than the pipe, the thermal insulation is thinner at that point. If desired, therefore, an additional covering of insulation 51 may be placed on the outside of the sheath 13, and a similar additional covering of insulation 52 may be placed on the outside of the sheath around the insulated joint 33 at the end of the pipe 11ª. Also above the last-mentioned insulated joint a sealing disk 28 may be employed and sealed against the inner periphery of the insulation 52 and against the pipe 11ª by a suitable sealing material 29 so as to effectively prevent the entrance of moisture to the insulation adjacent the pipe.

It will be apparent that I have provided a pipe system arranged for the heating of the pipe by the electrical impedance method and providing for the return of the current through a metallic current-carrying sheath or covering which is electrically insulated from the pipe by material which is also heat-insulating material and that such system is composed of units which may be factory prefabricated and tested, leaving very little installation work to be performed in the field. It will also be apparent that the piping when installed will be compact, will be proof against penetration by water, and the thermal insulating material will be well protected against mechanical damage. Moreover, the component parts can be fabricated and assembled on a production basis so that costs would be much lower than when such work is done in the field. The material of the metallic sheath should be such as to have high conductivity and good resistance to corrosion either from atmosphere or ground water, and should be nonmagnetic. Aluminum and copper, for example, will meet such requirements. The jumpers which are needed to convey the current from parts which would be otherwise insulated can be installed under conditions of factory supervision and the sealing tape applied to the T and the sealing disks 28 applied to the pipe sections by skilled labor and subject to factory inspection.

By reason of the fact that the current-conveying pipe and the current-conveying outer sheath are coaxial, interference with nearby electronic circuits will be held to a minimum which in some instances is an important advantage of the present arrangement.

While I have shown and described a preferred embodiment of my invention, it will be understood that it is not to be limited to all of the details shown, but is capable of modification and variation within the spirit of the invention and within the scope of the claims.

What I claim is:

1. A prefabricated pipe section comprising a length of metallic pipe, a covering of heat and electrical insulating material embracing said pipe, a sheath of electrically conductive metal embracing said insulating material and forming a cover therefor protecting the said material from damage and insulated thereby from the pipe, the said covering and sheath being substantially coextensive lengthwise of the pipe and terminating short of the ends of the latter leaving said ends exposed for connection to a similar section.

2. A prefabricated pipe section comprising a length of metallic pipe, a covering of heat and electrical insulating material embracing said pipe, a sheath of electrically conductive metal embracing said insulating material and forming a cover therefor protecting the said material from damage and insulated thereby from the pipe, the said covering and sheath being substantially coextensive lengthwise of the pipe and terminating short of the ends of the latter leaving said ends exposed for connection to a similar section, means for passing an electric current through said pipes and sheath comprising a transformer having its terminals connected to said pipe and sheath respectively, and a jumper electrically connecting the pipe and sheath at a point remote from said terminal connections.

3. A prefabricated pipe section comprising a length of metallic pipe, a covering of heat and electrical insulating material embracing said pipe, a sheath of electrically conductive metal embracing said insulating material and forming a cover therefor protecting the said material from damage and insulated thereby from the pipe, the said covering and sheath being substantially coextensive lengthwise of the pipe and terminating short of the ends of the latter leaving said ends exposed for connection to a similar section, and means covering the end faces of said insulating material between the pipe and sheath, said means having a water-repellent connection with the pipe and sheath.

4. A prefabricated pipe section comprising a length of metallic pipe, a covering of heat and electrical insulating material embracing said pipe, a sheath of electrically conductive metal embracing said insulating material and forming a cover therefor protecting the said material from damage, the said covering and sheath being substantially coextensive lengthwise of the pipe and terminating short of the ends of the latter leaving said ends exposed for connection to a similar section, said sheath being of nonmagnetic material of higher electrical conductivity than the pipe section and said sheath being electrically connected to the pipe by a connector passing through the insulating material at one point.

5. A prefabricated pipe fitting comprising a metallic T fitting having three branches, and a pipe section connected to each branch, a covering of heat and electrical insulating materials surrounding each branch and pipe section but terminating short of the ends of the latter to leave such ends exposed, a metallic sheath of electrically conductive material covering the insulated material of each branch and pipe section, the sheaths of two of the branches being electrically connected, and the sheath of the third branch being electrically insulated from that of each of said first two branches.

6. A prefabricated pipe fitting comprising a metallic T fitting having three branches, and a pipe section connected to each branch, a covering of heat and electrical insulating materials surrounding each branch and pipe section but terminating short of the ends of the latter to leave such ends exposed, a metallic sheath of electrically conductive material covering the insulated material of each branch and pipe section, the sheaths of two of the branches being electrically connected, and the sheath of the third branch being electrically insulated from each of said first two branches, one of said pipe sections being electrically insulated from the T fitting, a jumper electrically connecting the sheath of the third branch with said insulated section and a jumper electrically connecting said insulated section to its covering sheath adjacent the end of said section.

7. A piping arrangement for heating and transporting fluids comprising a plurality of lengths of pipe covered as set forth in claim 4 wherein the projecting ends of the pipes of adjacent lengths are welded together and covered with heat and electrical insulating material, and the latter being covered by a conductive metallic sheath electrically connected to the sheaths of the adjacent pipe lengths.

8. A prefabricated pipe fitting comprising a metallic T fitting having three branches, a covering of heat and electric insulating material covering said fitting, a metallic conductive sheath embracing the insulating material of each branch, the adjacent ends of the sheaths being spaced apart, means electrically connecting the sheath of one branch with that of a second branch, a pipe section connected to each branch of said fitting and extending beyond the insulating material, the pipe section connected to the second branch of the fitting being insulated from the fitting, and an electrical connector in contact with the sheath of the third branch and extending inwardly through the insulating material to make contact with said insulated pipe section.

9. A prefabricated pipe section comprising a length of metallic pipe, a covering of heat and electrical insulating material embracing said pipe, a sheath of electrically conductive metal embracing said insulating material and forming a cover therefor protecting the said material from damage, the said covering and sheath being substantially coextensive lengthwise of the pipe and terminating short of the ends of the latter leaving said ends exposed, said sheath comprising a closed water-tight tubular member of nonmagnetic material and a sealing member at the end face of the insulating material, said member embracing the pipe and making tight contact with the sheath.

10. A prefabricated pipe fitting comprising a metallic T fitting having three branches, and a pipe section connected to each branch, one of said pipe sections being electrically insulated from the branch to which it is connected, a covering of heat and electrical insulating materials surrounding each branch and pipe section but terminating short of the ends of the latter to leave such ends exposed, a metallic sheath of electrically conductive material covering the insulated material of each branch and pipe section, the sheaths of two of the branches being electrically connected, and the sheath of the third branch being electrically insulated from each of said first two branches, and sealing disks of water-repellent material covering the end faces of the insulating material about said pipe sections, said disks being sealed to the respective sheaths at their peripheries, and the ends of the pipe sections projecting beyond the sealing disks for connection with an adjacent pipe section means electrically connecting the sheath of said third branch with said insulated pipe section and electrically connecting said section to its covering sheath.

11. A prefabricated pipe section comprising a length of metallic pipe, a covering of heat and electrical insulating material embracing said pipe, a sheath of electrically conductive metal embracing said insulating material and forming a cover therefor protecting the said material from damage and insulated thereby from the pipe, the said covering and sheath being substantially coextensive lengthwise of the pipe and terminating short of the ends of the latter leaving said ends exposed for connection to a similar section, and a sealing disk surrounding the projecting end of the pipe section and lodged against the face of the insulating material, and said disk having a water-tight seal at its inner periphery with the pipe section and at its outer periphery with the sheath.

References Cited in the file of this patent

UNITED STATES PATENTS

| | | |
|---|---|---|
| 1,733,250 | Davis | Oct. 29, 1929 |
| 2,057,242 | Mautsch | Oct. 13, 1936 |
| 2,314,764 | Brown | Mar. 23, 1943 |
| 2,546,533 | Williamson | Mar. 27, 1951 |
| 2,580,244 | Roberts | Dec. 25, 1951 |
| 2,611,567 | Williamson | Sept. 23, 1952 |
| 2,658,527 | Kaiser | Nov. 10, 1953 |